INVENTOR.
ELMER C. FREBER
BY Alfred W. Petchaft
ATTORNEY

INVENTOR.
ELMER C. FREBER

BY Alfred W. Petchaft

ATTORNEY

Feb. 28, 1967

E. C. FREBER

TRANSMISSIONS 3,306,107

Filed April 22, 1964

INVENTOR.
ELMER C. FREBER
BY Alfred W. Petchaft
ATTORNEY

Feb. 28, 1967 E. C. FREBER 3,306,107

TRANSMISSIONS

Filed April 22, 1964

INVENTOR.
ELMER C. FREBER

BY Alfred W. Petchaft

ATTORNEY

Feb. 28, 1967 E. C. FREBER 3,306,107
TRANSMISSIONS
Filed April 22, 1964 7 Sheets-Sheet 5
FIG. 6
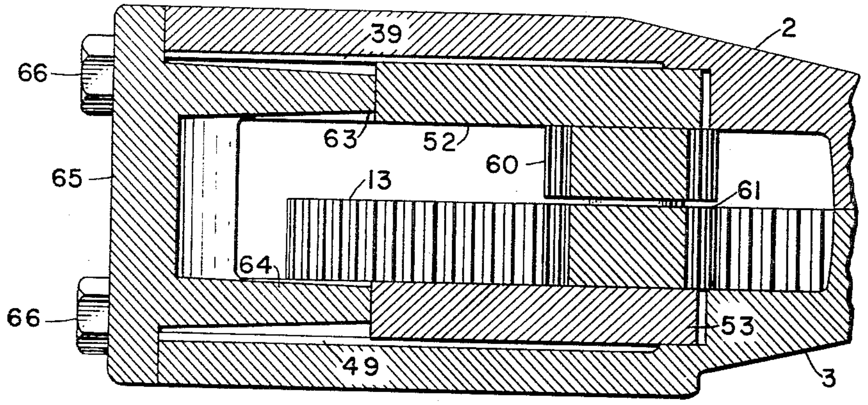
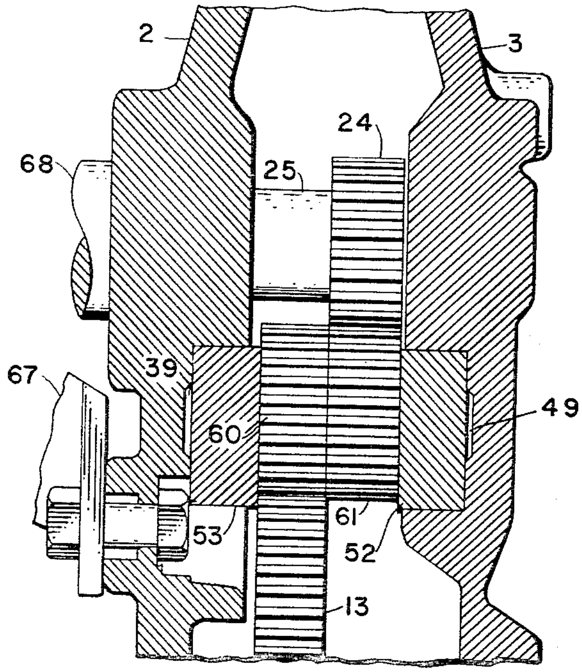
FIG. 7
INVENTOR.
ELMER C. FREBER
BY Alfred W. Petchaft
ATTORNEY Feb. 28, 1967 E. C. FREBER 3,306,107

TRANSMISSIONS

Filed April 22, 1964 7 Sheets-Sheet 6

INVENTOR.
ELMER C. FREBER
BY
Alfred W. Petchaft
ATTORNEY

Feb. 28, 1967 E. C. FREBER 3,306,107
TRANSMISSIONS
Filed April 22, 1964
7 Sheets-Sheet 7
FIG. 12
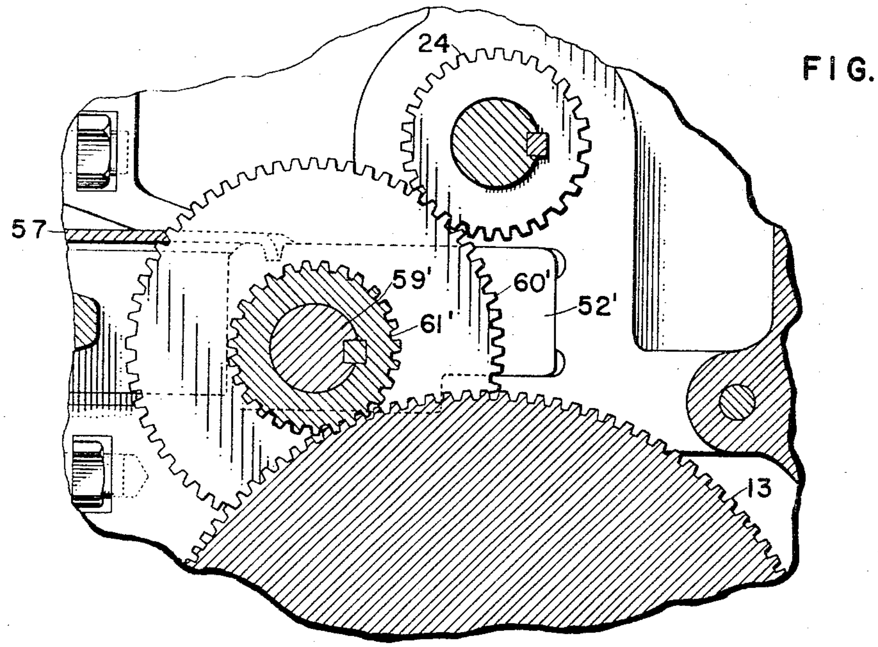
FIG. 10
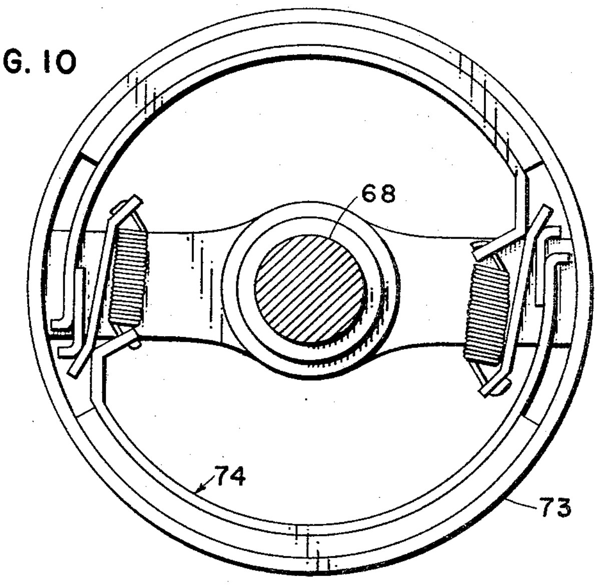
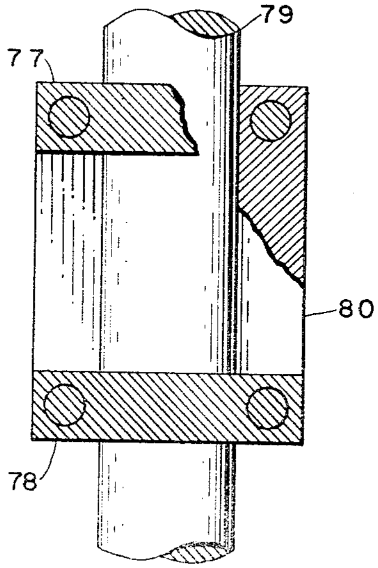
FIG. 11
INVENTOR.
ELMER C. FREBER
BY
Alfred W. Petchaft
ATTORNEY

United States Patent Office 3,306,107

Patented Feb. 28, 1967

3,306,107

TRANSMISSIONS

Elmer C. Freber, St. Louis, Mo., assignor to Marquette Tool and Die Company, St. Louis Mo., a corporation of Missouri Filed Apr. 22, 1964, Ser. No. 361,705
12 Claims. (Cl. 74—325)

This invention relates in general to certain new and useful improvements in transmissions and, more particularly, to a transmission for devices powered by an internal combustion engine, such as miniature automobiles, for example.

Many devices which are powered by internal combustion engines utilize a simple low-cost transmission that has a fixed gear-ratio. In the course of practical use, however, different speed or gear-ratios may be required for different load-conditions. It is, therefore, desirable to provide a transmission which will afford the desired gear-ratio for each of the various situations which may be encountered.

For example, in go-cart racing, it is often desirable to maintain an established gear-ratio according to the condition of each track in instances where the track does not provide for a set gear-ratio. For example, the miniature racing automobile owner would provide a large gear-ratio between the engine and driving wheels to maintain a high degree of torque at the driving wheels where the track has a number of curves requiring continual changes in the speed of the racing automobile. On tracks where there are long straightaways, and less turns, the miniature racing automobile owner would desire a low gear-ratio between the engine and the driving wheel in order to maintain a high speed at the driving wheels. On such race tracks, the rules often permit the owner of the racing automobile to choose any gear-ratio that he desires and it, therefore, becomes desirable to be able to change such gear-ratios with minimum inconvenience.

It is, therefore, the primary object of the present invention to provide a transmission which is provided with interchangeable change-gear assemblies.

It is another object of the present invention to provide a transmission wherein one or two engines can be optionally installed or removed by the use of interchangeable motor mounting bracket plates.

It is also an object of the present invention to provide a transmission of the type stated in which one change-gear assembly can be removed and another installed with a minimum amount of mechanical effort and in a minimum amount of time.

It is another object of the present invention to provide a transmission of the type stated which can be adjusted to maintain almost any given gear-ratio between the engine and the driving axle within a wide range of gear-ratios.

It is an additional object of the present invention to provide a transmission of the type stated which is light in weight, efficient in operation, and relatively inexpensive to manufacture.

It is another object of the present invention to provide a transmission of the type stated which is provided with a built-in clutch assembly for momentarily disengaging the driving axle from the engine of the miniature racing automobile in which installed.

With the above and other objects in view, my invention resides in the novel features of form, construction, arrangement, and combination of parts presently described and pointed out in the claims.

In the accompanying drawings—

Figure 1:
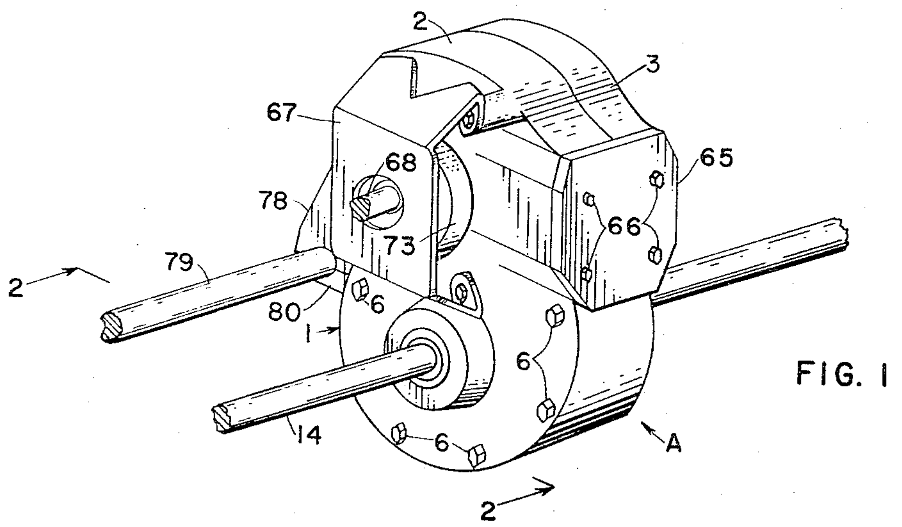
FIG. 1 is a perspective view of a transmission constructed in accordance with and embodying the present invention.
Figure 2:
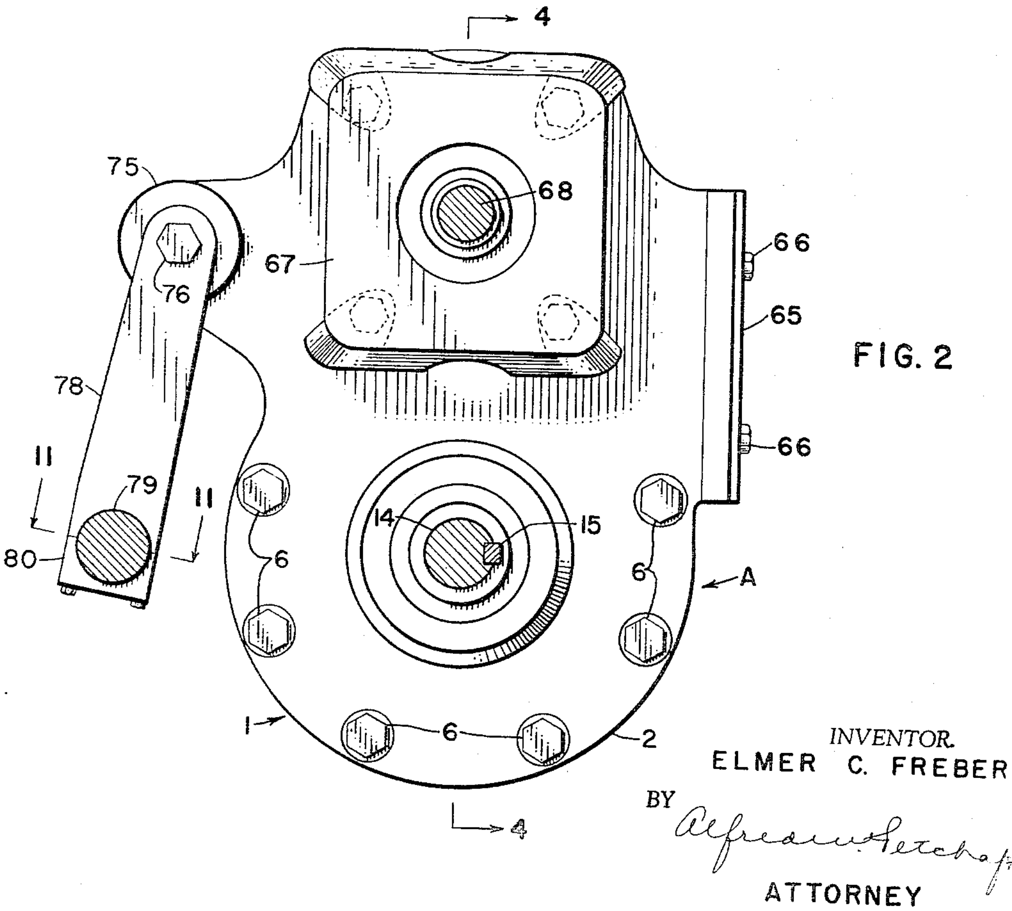
FIG. 2 is a front sectional view taken along line 2—2 of FIG. 1.
Figure 4:
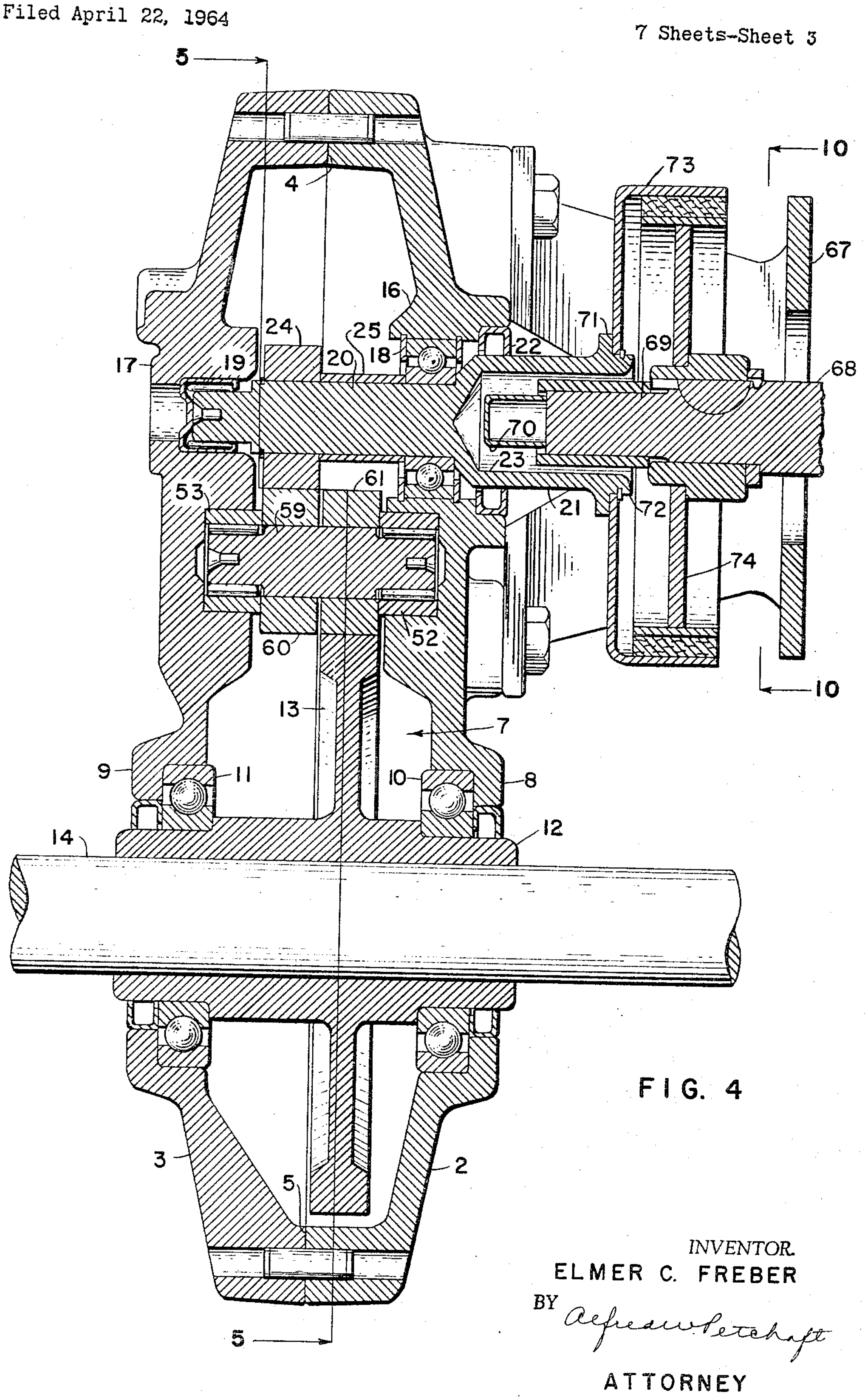
FIG. 4 is a vertical sectional view taken along line 4—4 of FIG. 2.
Figure 5:
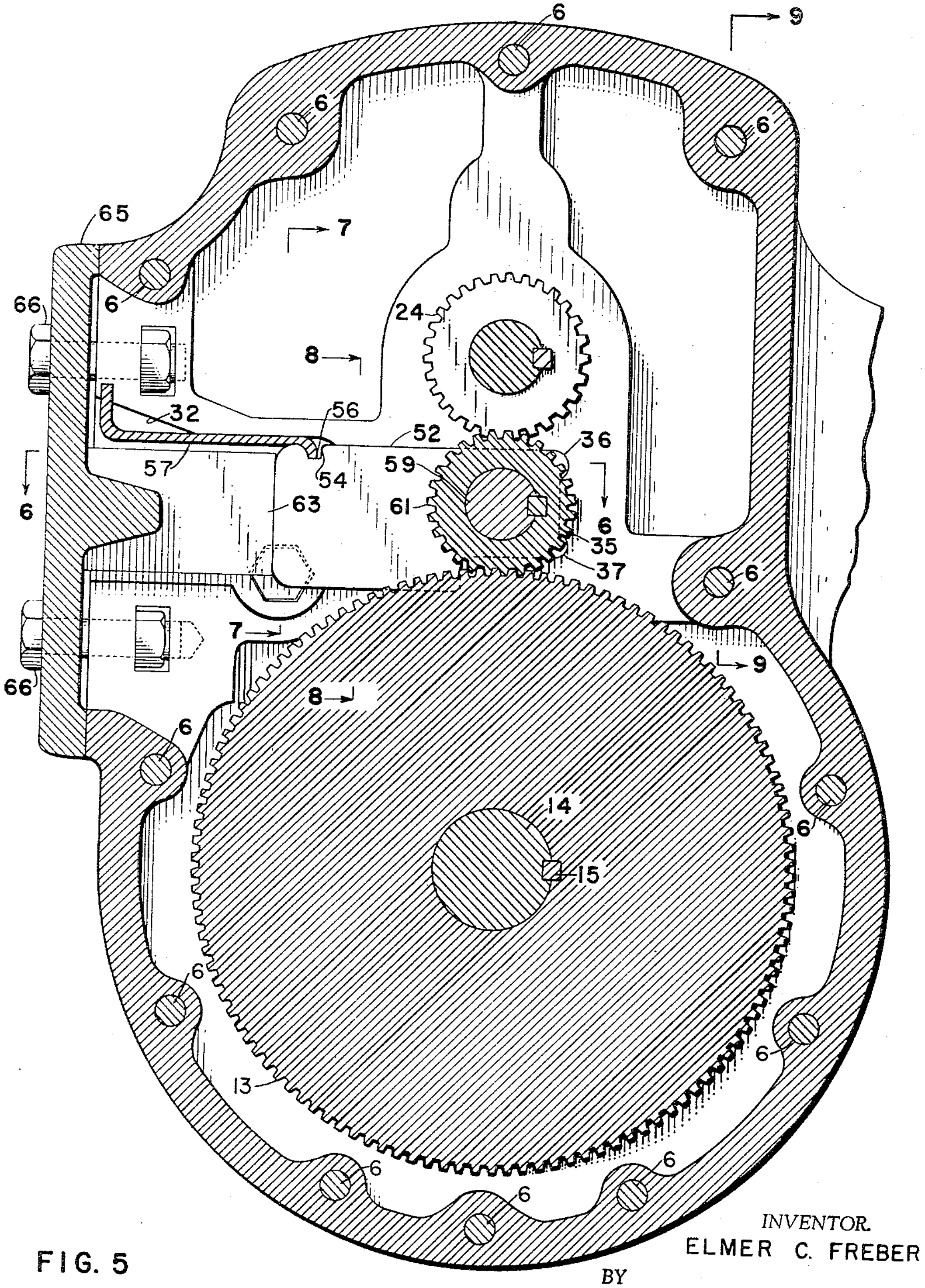
FIG. 5 is a horizontal sectional view taken along line 5—5 of FIG. 4.
Figure 8:
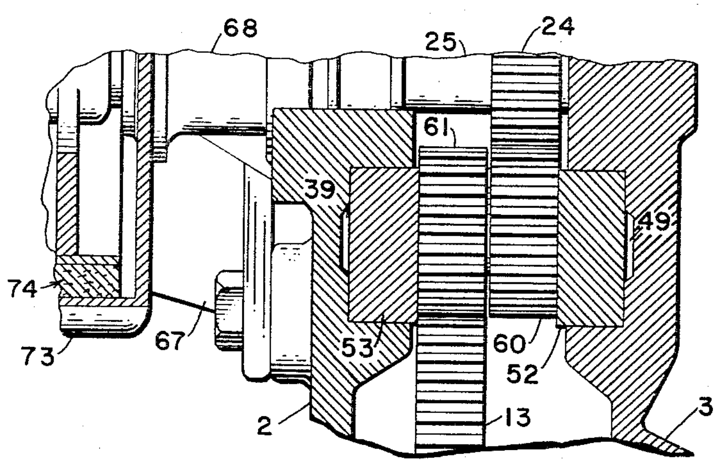
Figure 9:
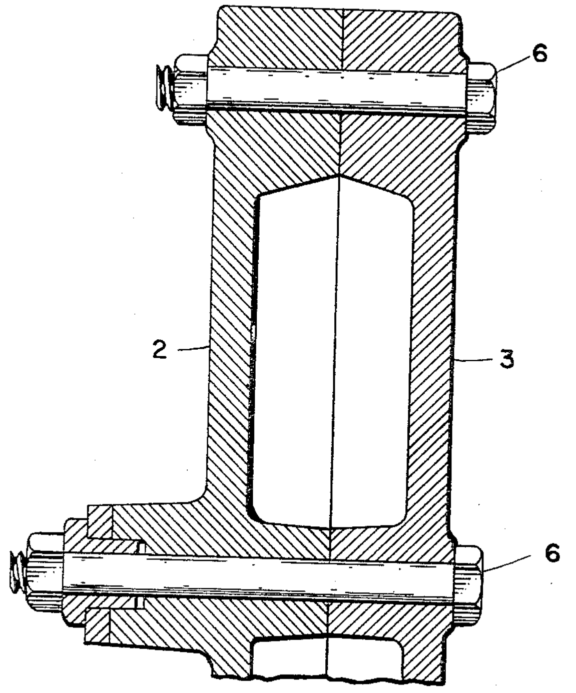

FIGS. 6, 7, 8, and 9, are fragmentary sectional views taken along lines 6—6, 7—7, 8—8, and 9—9, respectively, of FIG. 5;

FIG. 10 is a fragmentary sectional view taken along line 10—10 of FIG. 4;

FIG. 11 is a fragmentary sectional view taken along line 11—11 of FIG. 2; and

FIG. 12 is a schematic view of another change-gear assembly also forming part of the present invention.

Generally speaking, the transmission of the present invention includes an outer housing which can be conventionally mounted or secured upon the driven axle or shaft and stabilized in some suitable manner as by a link, arm, or bracket. The transmission is interiorly provided with a pinion gear mounted on a driven shaft and a drive gear which is mounted on a driving axle or shaft. Provided for interchangeable insertion in the housing in operative relation between the pinion gear and the drive gear is a removable gear-train or change-gear assembly which can be slidably pushed into or withdrawn from operative position and generally consists of a spur gear which is mounted on an idler shaft, the shaft, in turn, being journaled in a pair of bearing blocks. The bearing blocks are designed to fit within slide-ways formed within the end walls of the housing and abut against positioning shoulders so as to hold the spur gear in operative meshing relation with the pinion gear. Also mounted on the idler shaft is an intermediate gear which meshes with the drive gear and thereby rotates the drive shaft.

Referring now in more detail and by reference characters to the drawings, which illustrate practical embodiments of the present invention, A designates a transmission box of the type stated, which comprises an outer housing 1 consisting of a front plate 2 and a rear plate 3, having perimetral flanges 4, 5, held in assembled relation by a plurality of bolts 6. Together, the front and rear plates 2, 3, when in the assembled relation, form an internal compartment 7. The plates 2, 3, are integrally formed with axially aligned hub-forming bosses 8, 9, for retaining bearings 10, 11, respectively. Journaled in and extending axially through the bearings 10, 11, is a tubular gear-hub 12 of a driven gear 13, the gear-hub 12 being adapted for securement upon a driven axle or shaft 14 by a key 15.

The front and rear plates 2, 3, are also provided with axially aligned journal bosses 16, 17, internally bored respectively to accommodate a main ball bearing 18, and a closed-end needle bearing 19 for journaling a drive shaft 20. The drive shaft 20 is provided with a diametrally enlarged end-portion 21 which extends operatively through a neoprene rotary seal 22 and is provided with an axial socket 23 for purposes presently more fully appearing. Keyed or otherwise rigidly mounted upon the drive shaft 20 is a driven pinion 24 which is held in axially spaced relation to the ball bearing 18 by a spacer sleeve 25.

The front and rear plates 2, 3, are provided along matching lateral faces $f^1$, $f^2$, with outwardly extending enlargements 26, 27, having inwardly presented matching slide-ways or channels 28, 29. The channel 28 is provided with upper and lower parallel faces 30, 31, the upper face 30 merging into an oblique face 32 which diverges with respect to the face 31 so that, at the lateral face $f^1$ of the plate 2, the slide-way 28 is widened. Adjacent to its inner end, the face 31 is offset toward the face 30, thereby forming a shoulder 33 which, in turn, curves into an auxiliary slide-face 34. At its interior end, the slide-way 28 is provided with an inset end-face or abutment 35 which is connected into the faces 30, 34, by arcuate returns 36, 37. Finally, the side-face 38 of the slide-way 28 is provided with an elongated shallow clearance groove or trough 39 for purposes presently more fully appearing. Similarly, the slide-way 29 is provided with upper and lower parallel faces 40, 41, the upper face 40 merging into an oblique face 42 which diverges with respect to the face 41, so that, at the lateral face of the plate 2, the slide-way 29 is widened. Adjacent to its inner end, the face 41 is offset toward the face 40, thereby forming a shoulder 43 which, in turn, curves into an auxiliary slide-face 44. At its interior end, the slide-way 29 is provided with an inset end-face or abutment 45 which is connected into the faces 40, 44, by arcuate returns 46, 47. Finally, the side-face 48 of the slide-way 29 is provided with an elongated shallow clearance groove or trough 49 for purposes presently more fully appearing.

The faces 30, 40, are also relieved upwardly to provide clearance-recesses 50, 51, also for purposes presently more fully appearing.

Figure 3:
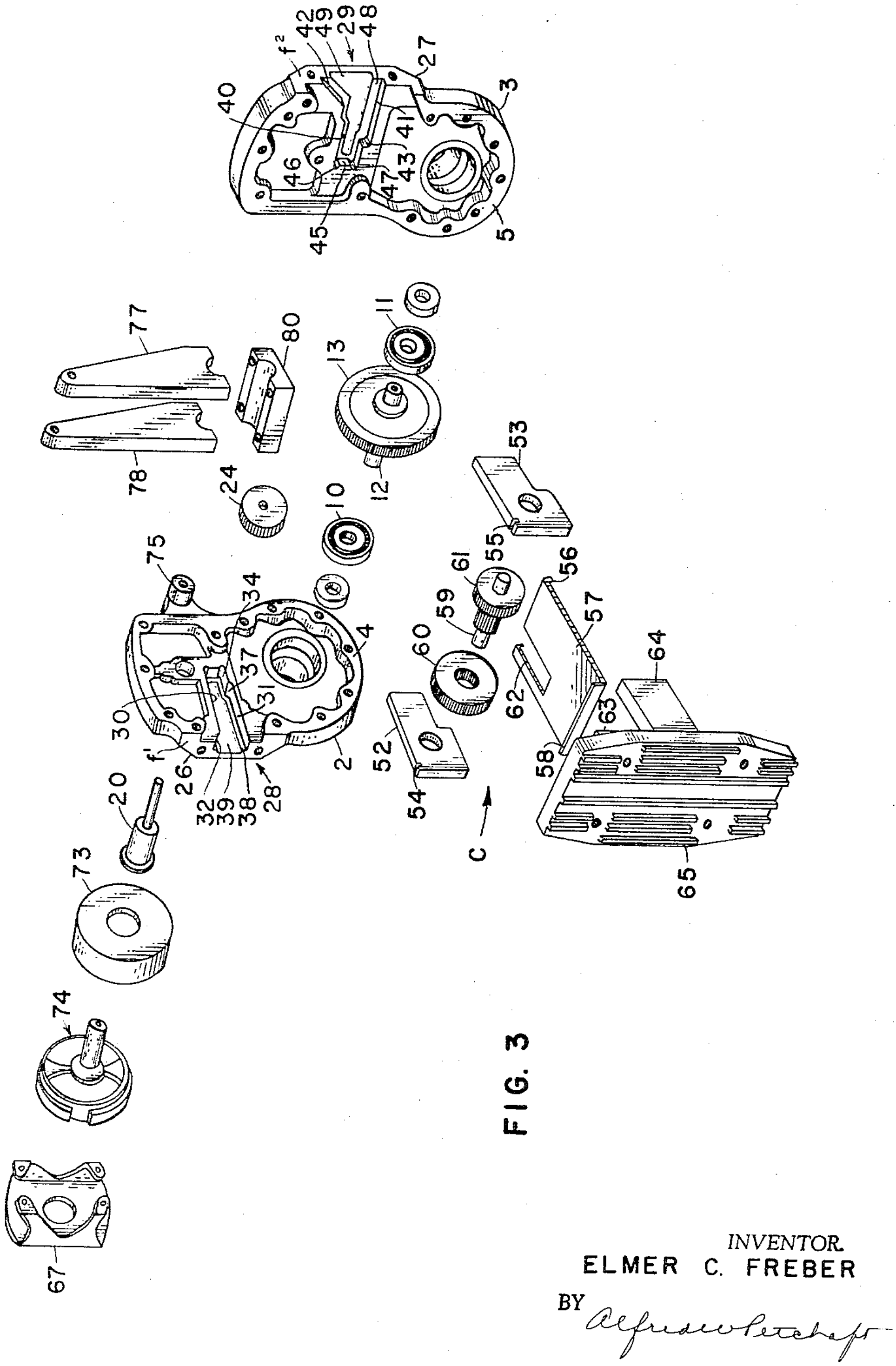
FIG. 3 is an exploded perspective view of the transmission.

Provided for removable insertion into the housing 1 within the slide-ways 28, 29, is a change-gear assembly C consisting of two slide-blocks 52, 53, shaped to fit snugly within the slide-ways 28, 29, into endwise abutment against the end-faces 35, 45, and having arcuately shouldered slots 54, 55, in their upper faces for receiving the hooked-lip 56 of a removal plate 57, the latter being integrally provided at its outer end with an upwardly bent gripper-flange 58 which extends into the clearance area formed by the oblique faces 32, 42. Journaled at its ends in, and extending horizontally between, the slide-blocks 52, 53, is an idler shaft 59 which rotatively supports change-gear pinions 60, 61, adapted for operative engagement respectively with the driven pinion 13 and the driving pinion 24. By reference to FIG. 3, it will be noted that the removal plate 57 is provided with a clearance slot 62 which loosely surrounds one portion of the change-gear 60.

As may be seen by reference to FIG. 5, the slide-blocks 52, 53, are shorter than the distance from the plane extending between the centerlines of the shafts 14, 20, to the plane of the external lateral faces $f^1$, $f^2$, and are held in operative position by endwise abutment against retainer arms 63, 64, which are integrally connected at their outer ends to a cover plate 65 removably secured to the faces $f^1$, $f^2$, by bolts 66. When securely bolted in place, the cover plate 65 and retainer arms 63, 64, hold the change-gears 60, 61, in meshing engagement with the pinions 13 and 24, respectively. Thus, it can be seen that as power is transmitted to the shaft 20, it will rotate the driving pinion 24, which will, in turn, rotate the pinion 61. This will, in turn, cause rotation of the idler shaft 59 and the intermediate pinion 60 which will cause rotation of the driving pinion 13 and the shaft or axle 14.

It can be seen that the change-gear pinions 60, 61, can be removed from the interior portion of the housing 1 merely by loosening the bolts 66, removing the cover plate 65, and then grasping the removal plate 57. Thereupon, the plate 57 and entire change-gear assembly C may be slid out of the housing 1 and replaced by a different change-gear assembly, such as the one shown in FIG. 12. In such change-gear assemblies, the slide-blocks 52', 53', are the same size and shape as the slide-blocks 52, 53, but the change-gears 60', 61', have different tooth-ratios and the location of the idler shaft 59' is accordingly different so that such different change-gears 60', 61', will mesh with pinions 13, 24.

Rigidly secured to the exterior surface of the front plate 2 is a bracket 67 which is, in turn, rigidly secured to the block of a conventional gasoline motor (not shown) having a crank shaft 68. The crank shaft 68 is integrally formed with a reducing forwardly extending portion 69 which is provided with a diametrally reduced forward end 70, the latter being loosely disposed within an enlarged socket 23 formed within the end of the driven shaft 20, all as can best be seen in FIG. 4. The driven shaft 20 is integrally formed at its outer end with an annular flange 71 and annular lip 72 for rigid attachment to a clutch drum 73. Disposed operatively within the clutch drum 73 and being rigidly secured on the crank shaft 68 is a conventional centrifugally operated clutch mechanism 74. The clutch mechanism 74 is conventional and, therefore, it is not described in detail herein.

The clutch mechanism 74 being of the centrifugally operated type will slip at low and "idle" speeds and will cause disengagement between the crank shaft 68 and the driven shaft 20. However, when the clutch mechanism 74 is held in its engaged position, at high engine speeds, the crank shaft 68 and the driven shaft 20 are, in effect, coupled and the shaft 20 is rotated thereby and will rotate the spur gear 24.

On one of its lateral faces, the front plate 2 is integrally provided with an outwardly projecting transversely apertured eye 75 adapted for receiving a bolt 76 for securement thereto of two parallel stibilizing arms 77, 78, which are arcuately cut out at their lower ends to fit around a transverse frame-rod 79. Moreover, along their downwardly presented end faces, the stabilizing arms 77, 78, are internally bored and tapped for registration with comparable bores formed in an end plate 80, the latter being secured to the downwardly presented end faces of the stabilizing arms 77, 78, by bolts 81, 82, 83, 84, and held thereby in encirclingly clamped engagement around the frame-rod 79. By this means, the transmission box A can be mounted upon a go-cart or other similar automotive vehicle by passing the driven axle or shaft 14 directly through the gear hub 12 in such a manner that the driven axle or shaft 14 serves as one mechanical support for the transmission box A. The stabilizing arms 77, 78, in cooperation with the frame-rod 79, provide further mechanical support for the transmission box A, and also hold it in stationary position, so that rotary movement will be imparted to the driven axle or shaft 14.

It should be understood that changes and modifications in the form, construction, arrangement, and combination of the several parts of the transmissions may be made and substituted for those herein shown and described without departing from the nature and principle of my invention.

Having thus described my invention, what I claim and desire to secure by Letters Patent is:

1. A transmission comprising an outer housing, a first shaft rotatably mounted within the housing, a first gear rotatably mounted within the housing for rotation with said first shaft, a second shaft rotatably mounted within the housing, a second gear rotatably mounted within the housing for rotation with said second shaft, said housing having an aperture and slide-ways extending inwardly from the aperture, support elements slidably disposed on the slide-ways, connecting gear means rotatably carried by the support elements and interposed between said first and second gear means for transmitting power therebetween, and means for removably securing the slide elements in a preselected fixed position on the slide-ways.

2. A transmission comprising an outer housing, a first shaft rotatably mounted within the housing, first gear means associated with said first shaft within said housing, a second shaft rotatably mounted within the housing, second gear means associated with said second shaft within said housing, said first and second gear means lying within planes which are offset with respect to each other, said housing having an aperture and at least one slide-way extending inwardly from the aperture, a support element slidably disposed on the slide-way, connecting gear means carried by the slide element and interposed between said first and second gear means for transmitting power therebetween, and means for removbaly securing the slide element in a preselected position on the slide-ways.

3. A transmission comprising an outer housing, a driven shaft rotatably mounted within the housing, first gear means associated with said driven shaft within said housing, a driving shaft rotatably mounted within the housing, second gear means associated with said driving shaft within said housing, said housing having an aperture and a pair of opposed slide-ways, extending inwardly from the aperture, a pair of support elements removably disposed in said slide-ways, a rotatable shaft extending between said support elements, connecting gear means mounted on said rotatable shaft and being interposed between said first and second gear means for transmitting power therebetween, and means for removably holding the support elements in a preselected position on the slide-ways.

4. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a pair of support elements removably disposed in said slide-ways, a rotatable shaft extending between said support elements and gear means mounted on said rotatable shaft and being interposed between said first and second gear means for transmitting power therebetween.

5. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, and a plurality of interchangeable connecting gear means, each of which can be operatively supported in said opposed slide-ways and can be operatively interposed between said first and second gear means for transmitting power between said driven shaft and said driving shaft.

6. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable connecting gear means, each of which can be operatively supported in said opposed slide-ways and can be operatively interposed between said first and second gear means for transmitting power between said driven shaft and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said first and second gear means 7. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable connecting gear means, each of which can be operatively supported in said opposed slide-ways and can be operatively interposed between said first and second gear means for transmitting power between said driven shaft and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said first and second gear means, the shaft of each of said connecting gear means being spaced in a different position in the pair of support elements with which it is associated with respect to the rotatable shaft of every other of said plurality of connecting gear means.

8. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable connecting gear means, each of which can be operatively supported in said opposed slide-way and can be operatively interposed between said first and second gear means for transmitting power between said driven shaft and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said first and second gear means, the shaft of each of said connecting gear means being spaced in a different position but in the same plane in the pair of support elements with which it is associated with respect to the rotatable shaft of every other of said plurality of connecting gear means.

9. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable connecting gear means, each of which can be operatively supported in said opposed slide-ways and can be operatively interposed between said first and second gear means for transmitting power between said driven shaft and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said first and second gear means, the rotatable shaft of each succeeding connecting gear means being spaced at a different position in the housing in relation to the driven and driving shafts.

10. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable connecting gear means, each of which can be operatively supported in said opposed slide-ways and can be operatively interposed between said first and second gear means for transmitting power between said driven shaft and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said first and second gear means, the rotatable shaft of each succeeding connecting gear means being spaced at a different position but in the same plane in the housing in relation to the driven and driving shafts.

11. A transmission comprising an outer housing, a driven shaft rotatably mounted within the housing, first gear means mounted on said driven shaft, a driving shaft rotatably mounted within the housing, second gear means mounted on said driving shaft, said housing having an aperture providing access to the interior portion thereof, a cover member disposed over and being removably secured to said housing, said housing being provided with opposed slide-ways on its interior walls, said slide-ways opening at one end upon said aperture, a plurality of interchangeable connecting gear means, each of which can be operatively supported in said opposed slide-ways and can be operatively interposed between said first and second gear means for transmitting power between said driven shaft and said driving shaft, and clutch means operatively associated with said driven shaft for optionally preventing power transference to the driven shaft.

12. A transmission comprising an outer housing, a first driven shaft rotatably mounted within the housing, first gear means mounted on said first driven shaft, a second driven shaft rotatably mounted within the housing, a second gear means mounted on said second driven shaft and being in operative engagement with said first gear means, a driving shaft rotatably mounted within the housing, third gear means mounted on said driving shaft, said housing having an aperture providing access to the interior portion thereof, a cover member disposed over said aperture and being removably secured to said housing, said housing being provided with opposed slide-ways on its interior walls, said slide-ways opening at one end upon said aperture, a plurality of interchangeable gear connecting means, each of which can be operatively supported in said opposed slide-ways and can be operatively interposed between said first and second gear means for transmitting power between said driven shafts and said driving shaft, each of said connecting gear means consisting of a pair of support elements which are provided for removable insertion in said opposed slide-ways, a rotatable shaft extending between said support elements, and a plurality of power transference gears mounted on said rotatable shaft and meshing with said second and third gear means.

References Cited by the Examiner

UNITED STATES PATENTS

| | | | |
|---|---|---|---|
| 2,735,309 | 2/1956 | Tew | 74—325 |
| 3,236,114 | 2/1966 | Freber | 74—325 |

FOREIGN PATENTS

| | | |
|---|---|---|
| 445,718 | 4/1936 | Great Britain. |

DAVID J. WILLIAMOWSKY, *Primary Examiner.*

H. S. LAYTON, *Assistant Examiner.*